(12) United States Patent
Urban et al.

(10) Patent No.: US 10,121,251 B2
(45) Date of Patent: Nov. 6, 2018

(54) METHOD FOR CONTROLLING TRACKING USING A COLOR MODEL, CORRESPONDING APPARATUS AND NON-TRANSITORY PROGRAM STORAGE DEVICE

(71) Applicant: THOMSON LICENSING, Issy les Moulineaux (FR)

(72) Inventors: Fabrice Urban, Thorigne Fouillard (FR); Lionel Oisel, La Nouaye (FR); Tomas Enrique Crivelli, Buenos Aires (AR)

(73) Assignee: Thomson Licensing, Issy-les-Moulineaux (FR)

( * ) Notice: Subject to any disclaimer, the term of this patent is extended or adjusted under 35 U.S.C. 154(b) by 203 days.

(21) Appl. No.: 15/206,196

(22) Filed: Jul. 8, 2016

(65) Prior Publication Data
US 2017/0011528 A1 Jan. 12, 2017

(30) Foreign Application Priority Data
Jul. 8, 2015 (EP) .................................... 15306119

(51) Int. Cl.
*G06K 9/00* (2006.01)
*G06T 7/00* (2017.01)
*G06T 7/246* (2017.01)

(52) U.S. Cl.
CPC ............ *G06T 7/0081* (2013.01); *G06T 7/248* (2017.01); *G06T 2207/10016* (2013.01); *G06T 2207/10024* (2013.01); *G06T 2207/20021* (2013.01)

(58) Field of Classification Search
None
See application file for complete search history.

(56) References Cited

U.S. PATENT DOCUMENTS 6,661,918 B1 * 12/2003 Gordon ................... G06K 9/38
382/164
7,317,830 B1 * 1/2008 Gordon ................... G06K 9/38
382/173

(Continued)

FOREIGN PATENT DOCUMENTS

CN 102169538 5/2012
CN 103413323 11/2013

OTHER PUBLICATIONS

Lucas et al., "An Iterative Image Registration Technique with an Application to Stereo Vision", International Joint Conference on Artificial Intelligence, Vancouver, Canada, Aug. 24, 1981, pp. 674-679.

(Continued)

*Primary Examiner* — Nancy Bitar
(74) *Attorney, Agent, or Firm* — Myers Wolin LLC

(57) ABSTRACT

A method for controlling tracking using a color model is disclosed. The method includes obtaining a window in a second frame of a video image corresponding to a window in a first frame of the video image using a tracking algorithm in a tracking mode, wherein each pixel in the video image has at least one color component. The method further includes defining a background area around the window in the first frame, assigning a pixel confidence value for each pixel in the second frame according to a color model, assigning a window confidence value for the window in the second frame according to the pixel confidence values of pixels in the window in the second frame, if the window confidence value is greater than a first confidence threshold, selecting the tracking mode, and if the window confidence value is not greater than the first confidence threshold, selecting a mode different from the tracking mode.

8 Claims, 4 Drawing Sheets

(56) References Cited

U.S. PATENT DOCUMENTS

| | | | |
|---|---|---|---|
| 7,526,102 B2* | 4/2009 | Ozer | G06K 9/00228 |
| | | | 382/103 |
| 8,290,253 B1* | 10/2012 | Wang | G06K 9/4652 |
| | | | 382/162 |
| 8,477,998 B1 | 7/2013 | Kim et al. | |
| 2003/0103647 A1 | 6/2003 | Rui et al. | |
| 2007/0058837 A1* | 3/2007 | Boregowda | G06T 7/223 |
| | | | 382/103 |
| 2014/0146997 A1* | 5/2014 | Chang | G06T 7/2046 |
| | | | 382/103 |
| 2015/0104066 A1 | 4/2015 | Shellshear | |

OTHER PUBLICATIONS

Shi et al., "Good Features to Track", IEEE Conference on Computer Vision and Pattern Recognition, Seattle, Washington, USA, Jun. 21, 1994, pp. 593-600.

Tomasi et al., "Detection and Tracking of Point Features", Carnegie Mellon University Technical Report CMU-CS-91-132, Apr. 1991, pp. 1-22.

Wang et al., "Effective Appearance Model for Probabilistic Object Tracking", Journal of Electronics (China), vol. 26, No. 4, Jul. 2009, pp. 503-508.

\* cited by examiner

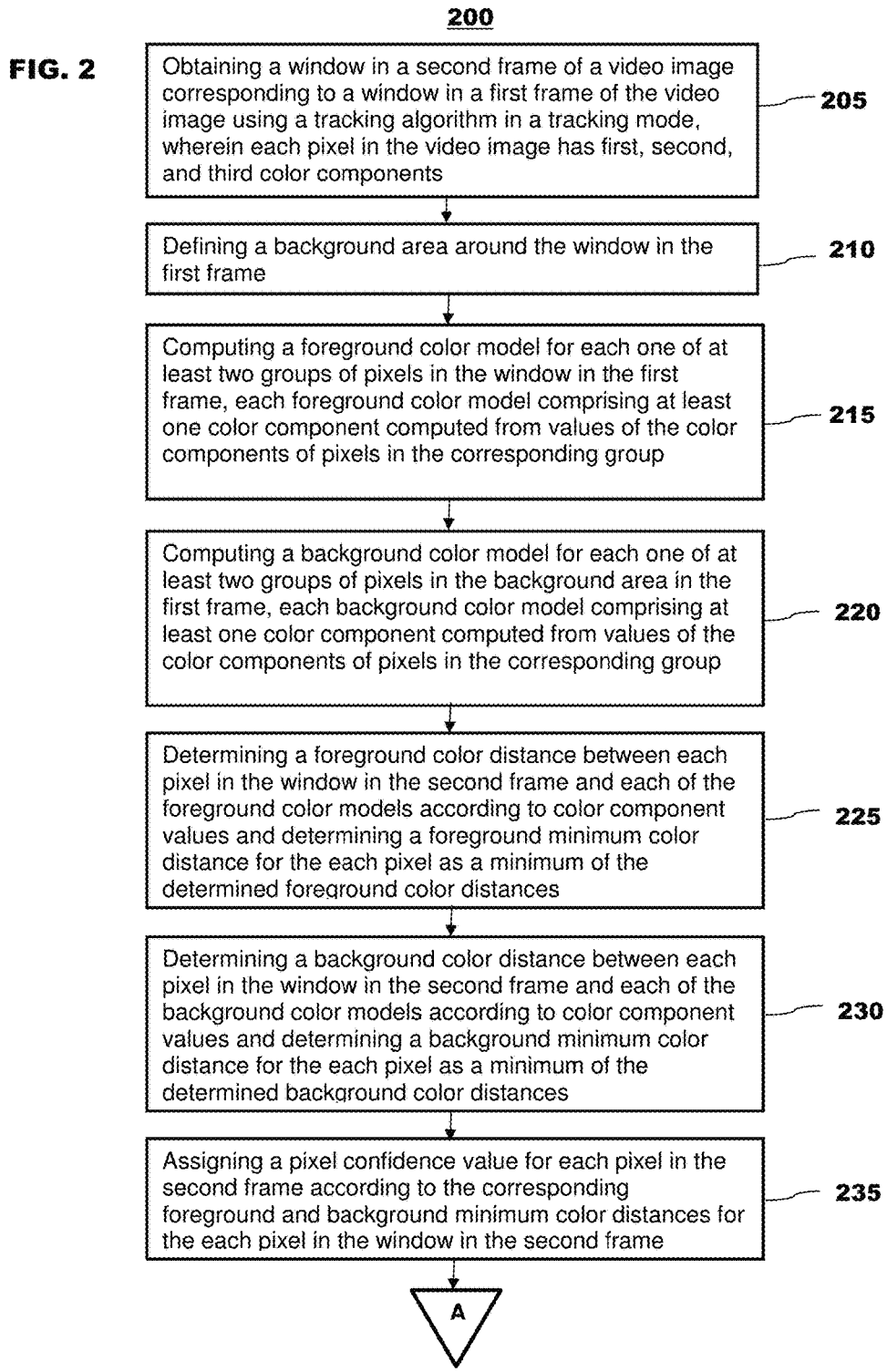

METHOD FOR CONTROLLING TRACKING USING A COLOR MODEL, CORRESPONDING APPARATUS AND NON-TRANSITORY PROGRAM STORAGE DEVICE

This application claims the benefit, under 35 U.S.C. § 119 of European Patent Application No. 15306119.7, filed Jul. 8, 2015.

BACKGROUND OF THE INVENTION

Field of the Invention

The present invention generally relates to tracking object in video images, and more particularly, to a method that controls tracking using a color model of the object being tracked.

Background Information

When an object in a video image tracked by a conventional video tracker is lost, the tracker either stops tracking or follows something else. Some conventional algorithms are also designed to re-detect lost objects. Such a solution is usually based on local features, such as Kanade-Lucas-Tomasi (KLT), Scale-invariant feature transform (SIFT), and Speeded-Up Robust Features (SURF); or global features, such as color histograms. A conventional video tracker may also monitor the quality of tracking according to a confidence value computed by the tracker algorithm.

One example of a conventional video tracker is the Kanade-Lucas-Tomasi (KLT) feature tracker, which is proposed mainly for the purpose of dealing with the problem that other conventional image registration techniques are generally costly. KLT makes use of spatial intensity information to direct the search for the position that yields the best match. It is faster than other conventional techniques because KLT examines far fewer potential matches between image frames.

The KLT feature tracker is based on the paper, Bruce D. Lucas and Takeo Kanade, "*An Iterative Image Registration Technique with an Application to Stereo Vision,*" *International Joint Conference on Artificial Intelligence*, pages 674-679, 1981, where Lucas and Kanade developed the idea of a local search using gradients weighted by an approximation to the second derivative of the image, in an iterative process. The tracking is computed on features (i.e., points with their neighborhood) that are suitable for the tracking algorithm. See Carlo Tomasi and Takeo Kanade, "*Detection and Tracking of Point Features,*" *Carnegie Mellon University Technical Report* CMU-CS-91-132, April 1991. A post-processing of the points can be done using the technique disclosed in the paper, Jianbo Shi and Carlo Tomasi, "*Good Features to Track,*" *IEEE Conference on Computer Vision and Pattern Recognition*, pages 593-600, 1994, where an affine transformation is fit between the image of the currently tracked feature and its image from a non-consecutive previous frame. If the affine compensated image is too dissimilar the feature is dropped.

There is a need to improve a conventional video tracker in the area of detecting when the tracked object is lost, the area of re-detecting of the lost object, the area of responding to tracking loss, and other areas.

SUMMARY OF THE INVENTION

In accordance with an aspect of the present disclosure, a method for controlling tracking using a color model is disclosed. The method comprises obtaining a window in a second frame of a video image corresponding to a window in a first frame of the video image using a tracking algorithm in a tracking mode, wherein each pixel in the video image has at least one color component; characterized by defining a background area around the window in the first frame; computing a foreground color model for each one of at least two groups of pixels in the window in the first frame, each foreground color model comprising at least one color component computed from values of the color components of pixels in the corresponding group; computing a background color model for each one of at least two groups of pixels in the background area in the first frame, each background color model comprising at least one color component computed from values of the color components of pixels in the corresponding group; determining a foreground color distance between each pixel in the window in the second frame and each of the foreground color models according to color component values and determining a foreground minimum color distance for the each pixel as a minimum of the determined foreground color distances; determining a background color distance between each pixel in the window in the second frame and each of the background color models according to color component values and determining a background minimum color distance for the each pixel as a minimum of the determined background color distances; assigning a pixel confidence value for each pixel in the second frame according to the corresponding foreground and background minimum color distances for the each pixel in the window in the second frame; assigning a window confidence value for the window in the second frame according to the pixel confidence values of pixels in the window in the second frame; if the window confidence value is greater than a first confidence threshold, selecting the tracking mode; and if the window confidence value is not greater than the first confidence threshold, selecting a mode different from the tracking mode.

In one embodiment, each color component of a color model of a group of pixels is computed by taking an average of corresponding components of pixels in that group.

In one embodiment, the method further comprises clustering pixels in the window in the first frame into a first predefined number of clusters based on color component values, and selecting the at least two groups of pixels in the window in the first frame by selecting a subset of the first predefined number of clusters, each group being one of the clusters in the selected subset.

In one embodiment, the method further comprises assigning a weight to each pixel in the window in the first frame, obtaining a sum of weights of pixels in each of the first predefined number of clusters, and selecting the subset comprising selecting clusters in the first predefined number of clusters having corresponding sums over a first sum threshold.

In one embodiment, assigning a weight of a pixel in the window in the first frame comprises assigning the weight according to a spatial distance between the pixel and a center of the window in the first frame.

In one embodiment, the method further comprises clustering pixels in the background area in the first frame into a third predefined number of clusters based on pixel values, and selecting the at least two groups of pixels in the background area in the first frame by selecting a subset of the third predefined number of clusters, each group being one of the clusters in the selected subset.

In one embodiment, the method further comprises assigning a weight to each pixel in the background area in the first frame, obtaining a sum of weights of pixels in each of the third predefined number of clusters, and selecting the subset comprising selecting clusters in the third predefined number of clusters having corresponding sums over a second sum threshold.

In accordance with an aspect of the present disclosure, a non-transitory computer readable medium is disclosed. The non-transitory computer readable medium having stored thereon instructions of program code for executing steps of the method according to any embodiment of the method described above, when said program code is executed on a computer.

In accordance with an aspect of the present disclosure, a video tracker is disclosed. The video tracker comprises memory means for storing a video image comprising at least first and second frames, each pixel in the video image having at least one color component; and processing means, characterized in that the processing means is configured to obtain a window in the second frame of a video image corresponding to a window in the first frame of the video image using a tracking algorithm in a tracking mode; define a background area around the window in the first frame; compute a foreground color model for each one of at least two groups of pixels in the window in the first frame, each foreground color model comprising at least one color component computed from values of the color components of pixels in the corresponding group; compute a background color model for each one of at least two groups of pixels in the background area in the first frame, each background color model comprising at least one color component computed from values of the color components of pixels in the corresponding group; determine a foreground color distance between each pixel in the window in the second frame and each of the foreground color models according to color component values and determining a foreground minimum color distance for the each pixel as a minimum of the determined foreground color distances;
determine a background color distance between each pixel in the window in the second frame and each of the background color models according to color component values and determining a background minimum color distance for the each pixel as a minimum of the determined background color distances; assign a pixel confidence value for each pixel in the second frame according to the corresponding foreground and background minimum color distances for the each pixel in the window in the second frame; assign a window confidence value for the window in the second frame according to the pixel confidence values of pixels in the window in the second frame; if the window confidence value is greater than a first confidence threshold, selecting the tracking mode; and if the window confidence value is not greater than the first confidence threshold, selecting a mode different from the tracking mode.

In one embodiment, each color component of a color model of a group of pixels is computed by taking an average of corresponding components of pixels in that group.

In one embodiment, the processing means is configured to cluster pixels in the window in the first frame into a first predefined number of clusters based on color component values, and select the at least two groups of pixels in the window in the first frame by selecting a subset of the first predefined number of clusters, each group being one of the clusters in the selected set.

In one embodiment, the processing means is configured to assign a weight to each pixel in the window in the first frame, obtain a sum of weights of pixels in each of the first predefined number of clusters, and select the subset by selecting clusters in the first predefined number of clusters having corresponding sums over a first sum threshold.

In one embodiment, the processing means is configured to assign a weight of a pixel in the window in the first frame by assigning the weight according to a spatial distance between the pixel and a center of the window in the first frame.

In one embodiment, the processing means is configured to cluster pixels in the background area in the first frame into a third predefined number of clusters based on pixel values, and select the at least two groups of pixels in the background area in the first frame by selecting a subset of the third predefined number of clusters, each group being one of the clusters in the selected subset.

In one embodiment, the processing means is configured to assign a weight to each pixel in the background area in the first frame, obtain a sum of weights of pixels in each of the third predefined number of clusters, and select the subset by selecting clusters in the third predefined number of clusters having corresponding sums over a second sum threshold.

In accordance with an aspect of the present disclosure, a video tracker is disclosed. The video tracker comprises memory for storing a video image comprising at least first and second frames, each pixel in the video image having at least one color component; and a processor, characterized in that the processor is configured to obtain a window in the second frame of a video image corresponding to a window in the first frame of the video image using a tracking algorithm in a tracking mode; define a background area around the window in the first frame; compute a foreground color model for each one of at least two groups of pixels in the window in the first frame, each foreground color model comprising at least one color component computed from values of the color components of pixels in the corresponding group; compute a background color model for each one of at least two groups of pixels in the background area in the first frame, each background color model comprising at least one color component computed from values of the color components of pixels in the corresponding group; determine a foreground color distance between each pixel in the window in the second frame and each of the foreground color models according to color component values and determining a foreground minimum color distance for the each pixel as a minimum of the determined foreground color distances;
determine a background color distance between each pixel in the window in the second frame and each of the background color models according to color component values and determining a background minimum color distance for the each pixel as a minimum of the determined background color distances; assign a pixel confidence value for each pixel in the second frame according to the corresponding foreground and background minimum color distances for the each pixel in the window in the second frame; assign a window confidence value for the window in the second frame according to the pixel confidence values of pixels in the window in the second frame; if the window confidence value is greater than a first confidence threshold, selecting the tracking mode; and if the window confidence value is not greater than the first confidence threshold, selecting a mode different from the tracking mode.

In one embodiment, each color component of a color model of a group of pixels is computed by taking an average of corresponding components of pixels in that group.

In one embodiment, the processor is configured to cluster pixels in the window in the first frame into a first predefined number of clusters based on color component values, and select the at least two groups of pixels in the window in the first frame by selecting a subset of the first predefined number of clusters, each group being one of the clusters in the selected set.

In one embodiment, the processor is configured to assign a weight to each pixel in the window in the first frame, obtain a sum of weights of pixels in each of the first predefined number of clusters, and select the subset by selecting clusters in the first predefined number of clusters having corresponding sums over a first sum threshold.

In one embodiment, the processor is configured to assign a weight of a pixel in the window in the first frame by assigning the weight according to a spatial distance between the pixel and a center of the window in the first frame.

In one embodiment, the processor is configured to cluster pixels in the background area in the first frame into a third predefined number of clusters based on pixel values, and select the at least two groups of pixels in the background area in the first frame by selecting a subset of the third predefined number of clusters, each group being one of the clusters in the selected subset.

In one embodiment, the processor is configured to assign a weight to each pixel in the background area in the first frame, obtain a sum of weights of pixels in each of the third predefined number of clusters, and select the subset by selecting clusters in the third predefined number of clusters having corresponding sums over a second sum threshold.

The aforementioned brief summary of exemplary embodiments of the present invention is merely illustrative of the inventive concepts presented herein, and is not intended to limit the scope of the present invention in any manner.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
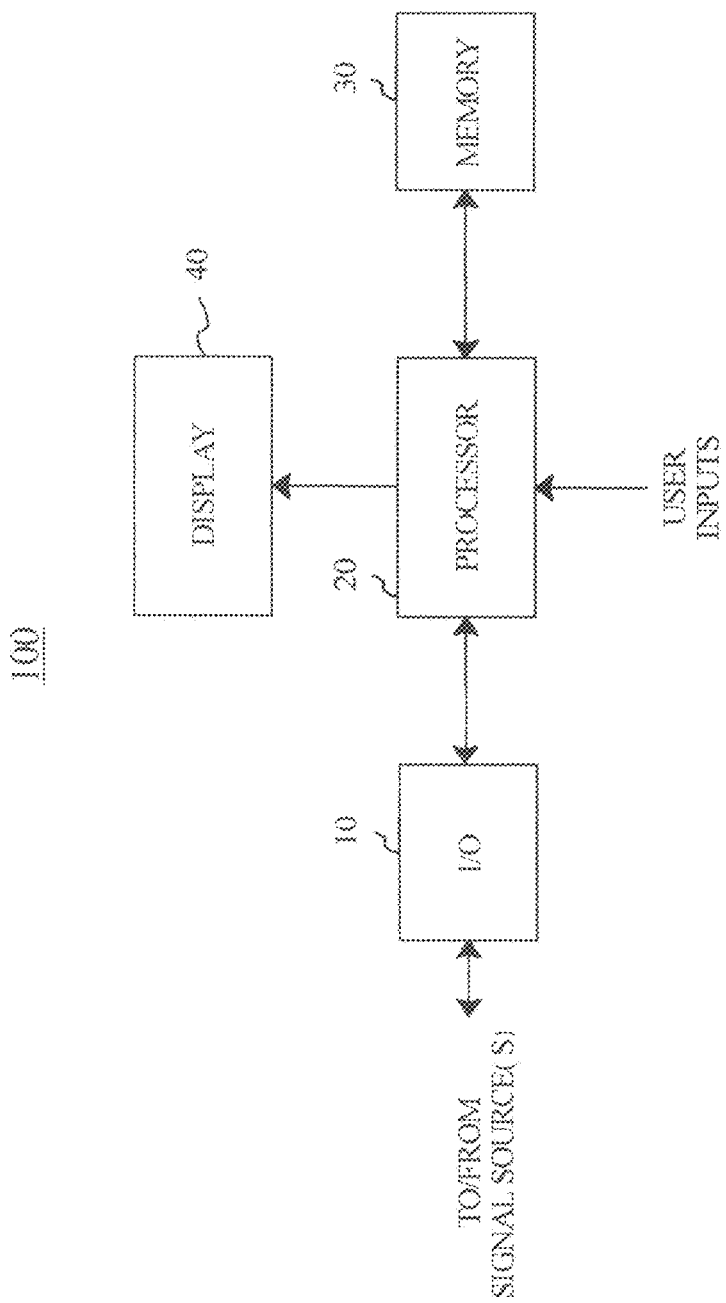
FIG. 1 is a block diagram of a relevant portion of a video tracker according to an exemplary embodiment of the present disclosure.

Referring now to the drawings, and more particularly to FIG. 1, a block diagram of a relevant portion of a video tracker 100 according to an exemplary embodiment of the present invention is shown. Video tracker 100 of FIG. 1 comprises input/output (I/O) means such as I/O block 10, processing means such as processor 20, memory means such as memory 30, and display means such as display 40. Some of the foregoing elements of video tracker 100 may be embodied using one or more integrated circuits (ICs). For clarity of description, certain conventional elements associated with video tracker 100 such as certain control signals, power signals and/or other elements may not be shown in FIG. 1.

Video tracker 100 of FIG. 1 may be embodied as any type of apparatus, device and/or system capable of tracking an object in video images. For example, video tracker 100 may be embodied as a television set, a set-top box (STB), digital versatile disk (DVD) player, video game box, personal video recorder (PVR), a cell phone, a laptop, or a tablet, and/or computer that may not include an integrated display device. Accordingly, depending on the embodiment, display 40 may, or may not, be integrated with the other elements of FIG. 1.

Input/output (I/O) block 10 is operative or configured to perform I/O functions of video tracker 100. According to an exemplary embodiment, I/O block 10 is operative or configured to receive signals such as audio, video and/or data signals in analog and/or digital format from one or more signal sources such as terrestrial, cable, satellite, internet and/or other signal sources. I/O block 10 is also operative or configured to output processed signals to one or more other devices, and to receive signals from such devices.

Processor 20 may include one or more of processing units, such as microprocessors, digital signal processors, or combination thereof and is operative or configured to perform various signal processing and control functions of video tracker 100. According to an exemplary embodiment, processor 20 processes the audio, video and/or data signals provided from I/O block 10 by performing functions including tuning, demodulation, forward error correction, transport processing, and decompressing functions to thereby generate digital data representing audio, video and/or data content. Video data generated by processor 20 may be output for display via display 40.

Processor 20 is operative or configured to receive a user input or a signal from I/O block 10 defining an object to be tracked and track the object.

Processor 20 is also operative or configured to execute software code that enables tracking objects or windows in video images according to principles of the present invention. Further details regarding processor 20 and the aforementioned aspect of the present invention will be provided later herein. Processor 20 is also operative or configured to perform and/or enable other functions of video tracker 100 including, but not limited to, receiving and processing user inputs, reading and writing data from and to memory 30, and/or other operations.

Memory 30 is operatively coupled to processor 20 and performs data storage functions of video tracker 100. According to an exemplary embodiment, memory 30 stores data including, but not limited to, software code, video image file data, user input data, buffered image data, composite image file data, and/or other data as referenced herein. Memory 30 may be embodied as any type of data storage device. A part of memory is a non-transitory program storage device readable by the processor 20, tangibly embodying a program of instructions executable by the processor 20 to perform program steps as described herein according to the principles of the embodiments of the invention.

Display 40 is operative or configured to provide visual displays of video data under the control of processor 20. As indicated above, display 40 may or may not be integrated with the other elements of video tracker 100. For example, if video tracker 100 is embodied as an apparatus/device/system such as a television set, display 40 may be integrated with the other elements of FIG. 1. Conversely, if video tracker 100 is embodied as an apparatus/device/system such as a set-top box (STB), display 40 may not be integrated with the other elements of FIG. 1.

Figure 2:
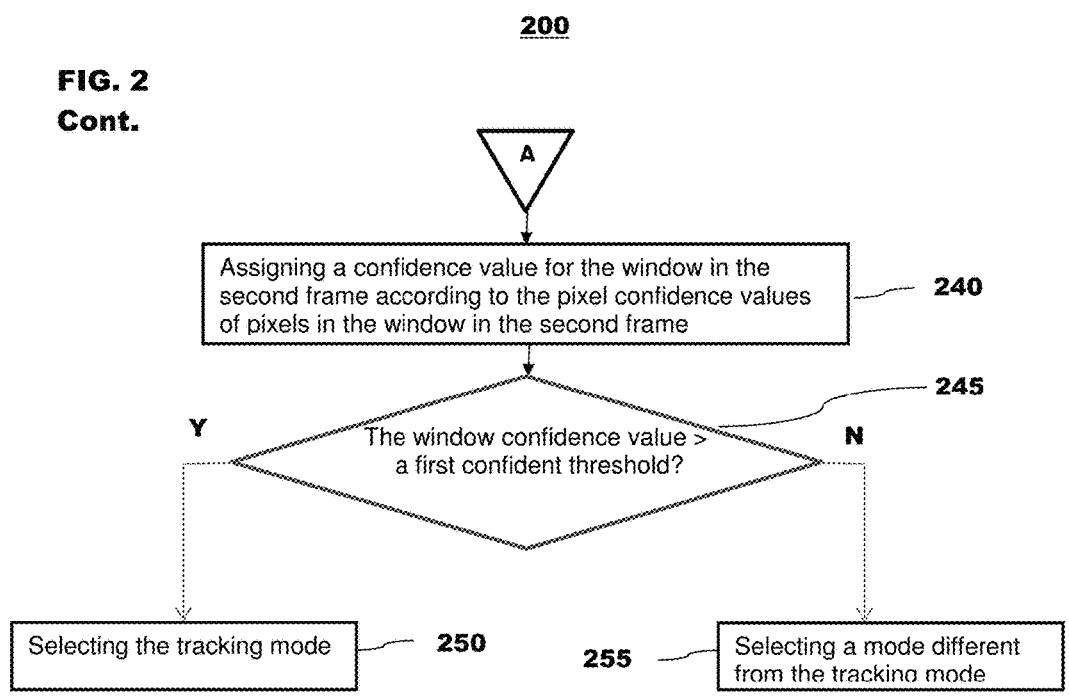
FIG. 2 is a flowchart illustrating steps for controlling tracking using a color model according to an exemplary embodiment of the present disclosure.

Referring now to FIG. 2, a flowchart 200 illustrating steps for controlling tracking using a color model according to an exemplary embodiment of the present disclosure is shown. For purposes of example and explanation, the steps of FIG. 2 relate to controlling tracking modes according to a confidence value determined based on a color model of a tracked object, which may be included in a window defined, for example, by a user or by the apparatus automatically. The user may define a window, which may include one or more objects using display 40 via a remote control or touching display 40 if display 40 is a touch sensitive display. The user may also specify the object by simply inputting the name of the object, such as "cat," and the apparatus detects the object in the video automatically using a conventional method. Also for purposes of example and explanation, the steps of FIG. 2 will be described with reference to video tracker 100 of FIG. 1. The steps of FIG. 2 are exemplary only, and are not intended to limit the present invention in any manner.

Figure 3:
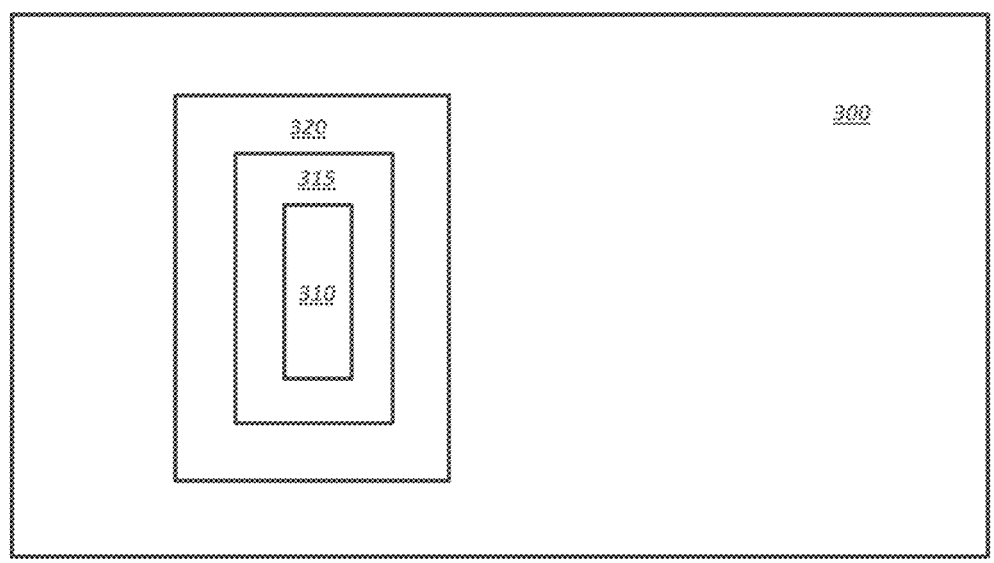
FIG. 3 is a diagram illustrating a track window and a background area in a first frame in a video image.

At step 205, processor 20 is operative and configured to obtain a window in a second frame of a video image corresponding to a window, such as window 310 in FIG. 3, in a first frame, such as first frame 300 shown in FIG. 3, of the video image using a tracking algorithm in a tracking mode, wherein each pixel in the video image has at least one color component, illustratively first, second, and third color components in the following discussion. The same principles can be applied to a video image having more than three color components. In one embodiment, the second frame is the immediate next frame after the first frame in a playback sequence. Thus, processor 20 is operative or configured to track the window 310 in a video including at least the first and the second frames. As stated above, the window 310 may be defined by a user through the display 40 and may include an object, such as a cat. In one embodiment, the processor 20 is operative or configured to find the object according to user input of an object name and define the object area as the window 310. Although illustrated in FIG. 3 that the window 310 in the first frame 300 is rectangular in shape, the window can be of any shape.

The tracking algorithm is a conventional algorithm such as the algorithm used in a KLT tracker mentioned previously. A KLT tracker in normal tracking mode estimates motion vectors for all points, which may be pixels or super pixels, in the window 310 in the first frame 300, moves each point according to the corresponding motion vector, and find corresponding points in the second frame. A super pixel is a perceptually consistent unit, in which all pixels in a super pixel are most likely uniform in, say, color. The found corresponding points in the second frame form the tracked window in the second frame. As used hereinafter, the term "pixel" can be a pixel or a super pixel.

Each pixel in the video image has at least one color component or channel, such as first, second, and third color components or channels. For example, a pixel may have three pixel values, each for a different one of red, green, blue components under the RGB color system, or one luma and two chrominance components under the YUV color system.

According to an embodiment of the present disclosure, if the number of the found corresponding points in the second frame is less than a first point threshold, the processor 20 is operative or configured to detect more points in the second frame and add to the found corresponding points to form the window in the second frame.

At step 210, the processor 20 is operative or configured to define a background area around the window 310 in the first frame 300. This background area is an area representing the background of the object represented by the window 310 and can be area 315, area 320 or the combination of areas 315 and 320 shown in FIG. 3. Selecting area 320 as the background area excluding the dead zone area 315 sitting between the window 310 and area 320 has the advantage that the area 320 more strongly represents the background. Assuming the geometry center of the window 310 is O, the spatial distance between the window 310 and area 315 and between area 315 and area 320 measured from an imaginary line extending from the center O at any angle intersecting a pixel at the perimeter of the window 310, a pixel at the outer perimeter of the area 315, and a pixel at the outer perimeter of the area 320 should be at least 10% of the spatial distance from the pixel on the perimeter of area 310 to the center O.

The next few steps determine a confidence value of the tracked window ("window confidence value" hereinafter) in the second frame according to the principles of the embodiments of the invention. That is, how good the tracking is or how much confident that processor 20 has that the window in the second frame represents the window 310 in the first frame 300.

At step 215, the processor 20 is operative or configured to compute a foreground color model for each one of at least two groups of pixels in the window 310 in the first frame 300, each foreground color model comprising at least one color component, illustratively first, second, third color components, computed from values of the color components of all pixels in the corresponding group and at step 220 the processor 20 is operative or configured to compute a background color model for each one of at least two groups of pixels in the background area, which is area 315, area 320, or the combination of both, in the first frame 300, each background color model comprising at least one color component, illustratively first, second, third color components, computed from values of the color components of all pixels in the corresponding group. As a result, there are at least two foreground color models and at least two background color models, one for each group.

In one embodiment, each color component of a color model of a group of pixels is computed by taking an average of corresponding components of pixels in that group. For example, if a group has N pixels and each pixel i has color components $C_i^0$, $C_i^1$, and $C_i^2$, the three color components of the color model of the group are calculated as follows:

$$C_g^k = \frac{\sum_{i=1,N} c_i^k}{N} \quad (1)$$

where k has the value of 0, 1, or 2, and g identifies the corresponding group.

In one embodiment, the processor 20 is operative or configured to assign a weight to each pixel in the window 310 in the first frame 300 and another weight to each pixel in the background area, which can be area 315, area 320 or the combination of areas 315 and 320 in the first frame 300. For example, the processor 20 may assign a weight to a pixel in the window 310 or in the background area in the first frame according to spatial distance of the pixel to the center of the window 310, in order to give more importance to pixels closer to the center of the object. The center, for example, is the geometry center of the window 310. In the following example, we assume that the window 310 is rectangular in shape and has a height of $H_t$ and a width of $W_t$, and the outer perimeter of the background area has a height of $H_b$ and a width of $W_b$. The weight of a pixel i, $w_{oi}$, in the window 310 and the weight of pixel j, $w_{bj}$, in the background area are illustratively computed as follows:

$$w_{oi} = 2 - \left[\frac{2dx}{W_t}\right]^2 + \left[\frac{2dy}{H_t}\right]^2$$

$$w_{bj} = \left[\frac{2dx}{W_b}\right]^2 + \left[\frac{2dy}{H_b}\right]^2$$

where dx,dy are the horizontal and vertical coordinates of the pixel from the center of the window 310, which is the origin of the coordinate system.

In one embodiment, in computing a color model of a group, the weight of each pixel is applied to the pixel. For example, in Equation (1), $C_i^k$ is multiplied by $w_{oi}$ if the pixel is in the window 310 or $w_{bi}$ if the pixel is in the background area in the first frame 300. In effect, each color component of the color model of the group is the weighted average of the corresponding color components of the pixels in the group.

In one embodiment, in order to reduce the computing time, the processor 20 is operative or configured to cluster the pixels in the window 310 in the first frame 300 into a first predetermined number, such as but not limited to ten, clusters according to pixel values using for example, but not limit to, a K-means algorithm. The processor 20 then is operative or configured to select the at least two groups of pixels in the window 310 by selecting a subset of the first predefined number of clusters, each group being one of the clusters in the selected subset of the first predefined number of clusters.

In one embodiment, the processor 20 is operative or configured to obtain a sum of weights of pixels in each of the first predefined number of clusters and select the subset by selecting clusters in the first predefined number of clusters having corresponding sums over a first sum threshold, for example, 50. The first sum threshold can be adaptive as well, for example to the median of the sums of the first predefined number of clusters.

In one embodiment, to further reduce the computing time, the processor 20 is operative or configured to select the subset according to the sums as the most significant at least two clusters from the first predefined number of clusters or the first defined number of clusters excluding those clusters having sums less than the first sum threshold. In this embodiment, the clusters in the subset may be as small as but not limited to 3.

In one embodiment, in a similar manner, the processor 20 is operative or configured to cluster the pixels in the background area in the first frame 300 into a third predetermined number, such as but not limited to 10, clusters according to pixel values using for example, but not limit to, a K-means algorithm. The processor 20 then is operative or configured to select the at least two groups of pixels in the background area by selecting a subset of the third predefined number of clusters, each group being one of the clusters in the selected subset of the third predefined number of clusters. In another embodiment, the processor 20 is operative or configured to obtain a sum of weights of pixels in each of the third predefined number of clusters and select the subset by selecting clusters in the third predefined number of clusters having corresponding sums over a second sum threshold, for example, 50. The second sum threshold can be adaptive as well, for example to the median of the sums of the third predefined number of clusters In one embodiment, similar to the clustering for the window 310, the processor 20 is operative or configured to select the subset according to the sums as the most significant at least two clusters from the third predefined number of clusters or the third defined number of clusters excluding those clusters having sums less than the second sum threshold. In this embodiment, the clusters in the subset may be as small as but not limited to 5.

In yet another embodiment, the clusters in the first predefined number of clusters and in the third predefined numbers of clusters are removed if they are close to each other before selecting the corresponding subsets. For each cluster o in the first predefined number of clusters, the processor 20 is operative or configured to compute the color distance $D_o$ between the cluster and the closest background cluster.

$$D_o = \underset{b}{\text{Min}}\left((C_o^0 - C_b^0)^2 + (C_o^1 - C_b^1)^2 + (C_o^2 - C_b^2)^2\right),$$

where $C_k^l$ is the value of the color component or channel l of the cluster k, which has a value of b representing one background cluster in the third predefined number of clusters, or a value of o representing one object cluster in the first predefined number of clusters. According to the above equation, a color distance between an object cluster (one of the first predefined number of clusters) and each background cluster (each of the third predefined number of clusters) is computed and the minimum color distance is the minimum of all the computed color distances.

If $D_o < D_{min}$, $D_{min} = 500$ but $D_{min}$ is not limited to 500, the processor 20 is operative or configured to remove object cluster o, and optionally remove background cluster b which is the closest cluster in the third predefined number of clusters to the object cluster o in the first predefined number of clusters.

At the end of these steps, we obtain two sets of color models composed of dominant colors for each of {object (the window 310), background (area 315, area 320, or combination of the two)}. Each set of color models comprises {colors: a list of RGB or YUV values, nbClusters: number of retained clusters}.

At step 225, the processor 20 is operative or configured to determine a foreground color distance between each pixel in the window in the second frame and each of the foreground color models according to color component values and determine a foreground minimum color distance for the each pixel as a minimum of the determined foreground color distances. More generally, the processor 20 is operative or configured to determine a foreground color distance between a plurality of pixels in the window in the second frame and each of the foreground color models according to color component values and determine a foreground minimum color distance for the each pixel of the plurality of pixels as a minimum of the determined foreground color distances. At step 230, the processor 20 is operative or configured to determine a background color distance between each pixel in the window in the second frame and each of the background color models according to color component values and determine a background minimum color distance for the each pixel as a minimum of the determined background color distances. More generally, the processor 20 is operative or configured to determine a background color distance between each pixel of the plurality of pixels in the window in the second frame and each of the background color models according to color component values and determine a background minimum color distance for the each pixel of the plurality of pixels as a minimum of the determined background color distances. Assume a pixel in the window in the second frame has a color C which $C^0$, $C^1$, and $C^2$ as the color components, the color distance of the pixel to a color model k, which is a foreground color model representing a cluster in the subset of the first predefined number of clusters or a background color model representing a cluster in the subset of the third predefined number of clusters, is $((C_k^0-C^0)^2+(C_k^1-C^1)^2+(C_k^2-C_2)^2)$. $D_o$ and $D_b$ respectively demoting the foreground minimum color distance and the background minimum color distance for the pixel can be computed as follows:

$$D_i = \min_{k<nbClusters_i}\left((C_k^0-C^0)^2+(C_k^1-C^1)^2+(C_k^2-C^2)^2\right), i=\{o,b\}$$

where o and b respectively represent a cluster in the subset of the first predefined number of cluster and a cluster in the subset of the third predefined number of cluster.

A foreground color distance, a background color distance, a foreground minimum color distance, or a background minimum color distance between two sets of component values A and B can be a Euclidean distance defined as follows:

$$D_{ab}=\sqrt{(A1-B1)^2+(A2-B2)^2+(A3-B3)^2}$$

The color distance can be defined as $(A1-B1)^2+(A2-B2)^2+(A3-B3)^2$ or $|A1-B1|+|A2-B2|+|A3-B3|$, as well.

At step 235, the processor 20 is operative or configured to assign a pixel confidence value for each pixel of the plurality of pixels in the window in the second frame according to the corresponding foreground and background minimum color distances for that pixel in the window in the second frame. A pixel confidence value represents how confident the processor 20 of that pixel in tracking is. For example, a confidence $cf_p$ for each pixel p in the window in the second frame can be determined from the corresponding foreground minimum color distance, $D_o$, and the corresponding background minimum color distance, $D_b$, as follows:

$$cf_p = \begin{cases} \frac{2\times D_b - D_o}{2\times D_b + D_o} & \text{if } D_b > D_o \\ 0 & \text{if } D_b \leq D_o \end{cases}$$

At step 240, the processor 20 is operative and configured to assign a window confidence value cf for the window in the second frame according to the pixel confidence values of pixels in the window in the second frame. For example, the window confidence value cf for the window in the second frame is an average of the pixel confidence values of all the pixels in the window in the second frame.

At step 245, the processor 20 is operative or configured to determine whether the confidence value cf is greater than a first confidence threshold th. If the confidence value cf is greater than the first confidence threshold th, the processor 20 at step 250 is operative or configured to select the tracking mode; and if the confidence value cf is equal or less than the first confidence threshold th, the processor 20 at step 255 is operative or configured to select a mode different from the tracking mode, such as an occlusion mode indicating that the tracking is lost. In the occlusion mode, the processor 20 is operative or configured to save the state of the tracking in the first frame 300 and deactivate motion estimation. Thus, the processor 20 maintains the tracking mode if cf>th but switches to the occlusion mode if cf<th indicating that the tracking is lost and the window in the second frame does not represent the window 310 in the first frame 300.

More generally the processor is operative or configured to select among the tracking mode or a mode different from the tracking mode, based on a window confidence value for the window in the second frame, wherein the window confidence value is obtained according to the pixel confidence values of the plurality of pixels in the window in the second frame.

In one exemplary embodiment, the confidence threshold th is predefined, such as 0.5. In another embodiment, the confidence threshold th is adaptive to the noise estimation in the computation of the confidence value cf. In addition, the threshold is temporally filtered to avoid too fast variations. The adaptive threshold for frame number t is computed as follows:

1. Initialize $cf_t$ (current confidence value for frame t) to $cf_0$ (initial confidence value, which can be but not limited to 0.6), by the processor 20, at the first tracked frame, such as the first frame 300, as follows:
   set the current sliding average confidence value $\overline{cf}_0=cf_t$,
   set current variation $v_0=cf_0\times mv_t$ where $mv_t=0.6$ is a predefined coefficient but not limited to 0.6, and
   set initial first confidence threshold $th_0=cf_0\times mt_t$ where $mt_t=0.6$ is a predefined coefficient but not limited to 0.6.

2. For subsequent frames, such as the second and third frames, the processor 20 is operative or configured to
   set the current sliding average confidence value $\overline{cf}_t=$max $\overline{cf}_{t-1}+(1-ma)\times cf_t$, where ma=0.95 but not limited to 0.95,
   set the variation as $v_t=\max(|\overline{cf}_t-cf_t|, v_{min})$ where $v_{min}=0.1$ is a predefined constant but not limited to 0.1;
   set the confidence threshold as $th_t=mp\times th_{t-1}+(1-mp)\times \min(th_0,\max(0,cf_t+md\times v_t))$ where md=−3 but not limited to −3 and mp=0.98 but not limited to 0.98; they are predefined constants.

Using the same confidence threshold may cause the processor 20 to oscillate between the tracking and occlusion modes. To avoid this, in another embodiment, a hysteresis system is employed, in which two different confidence thresholds, $th_l$ and $th_h$, are used as follows, where this the low or occlusion confidence threshold and $th_h$, is the high or tracking confidence threshold. If in tracking mode and cf<$th_l$, the processor 20 is operative or configured to determine that the tracking is lost and switch the mode to the occlusion mode. If in occlusion mode and cf>$th_h$, the processor 20 is operative or configured to determine that the occlusion is over and switch the mode back to the tracking mode. The two thresholds $th_l$ and $th_h$ are two different thresholds and $th_l<th_h$. If the two thresholds $th_l$ and $th_h$ are predefined, they can be but not limited to 0.5 and 0.8, respectively.

If the two thresholds are adaptive to the noise estimation in the computation of cf, the computation is similar to previous definition, in which the same threshold is used to select a mode. Some differences are:

1. At the initialization, the processor 20 is operative or configured to
   set mode to tracking mode, set initial low confidence threshold $th_{l,0}=cf_0 \times mt_l$ where $mt_l=0.6$ but not limited to 0.6, and set initial high confidence threshold $th_{h,0}=cf_0 \times mt_h$ where $mt_h=0.9$ but not limited to 0.9.

2. For subsequent frames, the processor 20 is operative or configured to set the low or occlusion confidence threshold $th_{l,t}$ as follows:

$$th_{l,t}=mp \times th_{l,t-1}+(1-mp) \times \min(th_{l,0}, \max(0, cf_{t-1}+md_l \times v_t))$$

where $$md_l = \begin{cases} -3 & \text{if tracking} \\ +1 & \text{if occlusion} \end{cases}$$

and mp=0.98 are defined constants but not limited to 0.98. Thus, the low or occlusion confidence threshold definition depends on the mode. It is higher than the current confidence in occlusion mode, and lower in tracking mode.

The processor 20 is operative or configured to set the high or tracking confidence threshold $th_{l,t}$ as follows. If the current mode is the occlusion mode, $th_{h,t}=th_{h,t-1}$ and if the current mode is the tracking mode, $th_{h,t}=mp \times th_{h,t-1}+(1-mp) \times \min(th_{h,0}, cf_t+md_h \times v_t)$ where $md_h=-2$ but not limited to $-2$. Thus, in the occlusion mode, the high or tracking confidence threshold is not changed but is changed if the current mode is the tracking mode.

When the tracking mode is maintained, the processor 20 is operative or configured to track the window in the second frame in a third frame. When the processor 20 determines to switch the mode from the tracking mode to the occlusion mode, the processor 20 is operative or configured to save the state of the tracking in the first frame 300, deactivate motion estimation, and switch to the occlusion mode. If the confident value (computed with respect to the saved state) is above the first confidence threshold, which can be the predefined threshold $th_h$ or adaptive as discussed above, the processor 20 is operative or configured to switch the mode back to the tracking mode. In the occlusion mode, the processor 20 is operative or configured to detect new points or pixels in the tracking window in the second frame, so that the window confidence value can be updated with respect to the saved state. This process continues for a subsequent frame, such as the third frame. It is thus evaluated whether the object to track reappears in the tracking window.

Assuming that the window confidence value of the window in the frame n+1 is below a first confidence threshold and the processor selects the occlusion mode, the saved state, for example, includes: tracked points on frame n, position of tracking window on frame n, and frame n pixels are saved.

To summarize, the window confidence value of the (tracked) window of a current frame n+1 is determined with respect to the window of the previous frame n in the tracking mode, the processor 20 is operative or configured to save the state of tracking of frame n if the processor 20 selects the occlusion mode, the processor 20 is operative or configured to detect new points in a subsequent frame, such as frame n+2, and compute the window confidence value with respect to the saved state, and when the window confidence value is above a first confidence threshold again, the processor 20 is operative or configured to switch back to the tracking mode. In one embodiment, the processor 20 is always operative or configured to save the state of tracking every time the window confidence value is above a confidence threshold.

The newly saved state overwrites the previous saved state and the newly saved state is used for computing the window confidence value for a subsequent frame.

In one embodiment, instead of static detection of new pixels in the occlusion mode, the processor 20 is operative or configured to perform the following in the occlusion mode:

1. Continue to track between saved frame and frame n+1 in current loop using the tracking algorithm, such the KLT tracking algorithm, used in tracking mode;
2. Compute the new tracking window as in normal tracking mode;
3. Detect the new points if necessary (to replace lost points in, for example, the optical flow estimation) in new position of the tracking window in frame n+1;
4. Compute the window confidence value again on all points on frame n+1;
5. If the window confidence value is high enough, switch the mode back to tracking; otherwise the occlusion mode is maintained for a subsequent frame, such as frame n+2.

This embodiment assumes that the object can move between occlusion and redetection is tested. In addition, tracking drifts can be detected and corrected.

Advantages of applying the techniques in this disclosure are as follows:

the tracking confidence is based on simple object appearance model;

tracking/redetection technique is unified and can work with a large range of tracker, in addition to KLT; and for real-time implementation, complexity for tracking and redetecting is the same.

The disclosed techniques have been successfully implemented on an Android smartphone with 30 fps at 1080p resolution.

As described herein, the present invention provides a method that more effectively controls the tracking using a color model. While this invention has been described as having a preferred design, the present invention can be further modified within the scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A video tracker device comprising:
    a memory for storing a video image comprising at least first and second frames, each pixel in the video image having at least one color component; and
    a processor configured to:
    obtain a window in the second frame of a video image corresponding to a window in the first frame of the video image using a tracking algorithm in a tracking mode;
    compute a foreground color model for each one of at least two groups of pixels in the window in the first frame, each foreground color model comprising at least one color component computed from values of the color components of pixels in the corresponding group;
    compute a background color model for each one of at least two groups of pixels in a background area around the window in the first frame, each background color model comprising at least one color component computed from values of the color components of pixels in the corresponding group;

determine a foreground color distance between each pixel in the window in the second frame and each of the foreground color models according to color component values and determining a foreground minimum color distance for the each pixel as a minimum of the determined foreground color distances;

determine a background color distance between each pixel in the window in the second frame and each of the background color models according to color component values and determining a background minimum color distance for the each pixel as a minimum of the determined background color distances;

assign a pixel confidence value for each pixel in the second frame according to the corresponding foreground and background minimum color distances for the each pixel in the window in the second frame;

assign a window confidence value for the window in the second frame according to the pixel confidence values of pixels in the window in the second frame;

if the window confidence value is greater than a first confidence threshold, selecting the tracking mode; and if the window confidence value is not greater than the first confidence threshold, selecting a mode different from the tracking mode.

2. The video tracker according to claim 1, wherein each color component of a color model of a group of pixels is computed by taking an average of corresponding components of pixels in that group.

3. The video tracker according to claim 1, wherein the processor is further configured to cluster pixels in the window in the first frame into a first predefined number of clusters based on color component values, and select the at least two groups of pixels in the window in the first frame by selecting a subset of the first predefined number of clusters, each group being one of the clusters in the selected set.

4. The video tracker according to claim 1, wherein the processor is further configured to assign a weight to each pixel in the window in the first frame, obtain a sum of weights of pixels in each of the first predefined number of clusters, and select the subset by selecting clusters in the first predefined number of clusters having corresponding sums over a first sum threshold.

5. The video tracker according to claim 1, wherein the processor is further configured to assign a weight of a pixel in the window in the first frame by assigning the weight according to a spatial distance between the pixel and a center of the window in the first frame.

6. The video tracker according to claim 1, wherein the processor is further configured to cluster pixels in the background area in the first frame into a third predefined number of clusters based on pixel values, and select the at least two groups of pixels in the background area in the first frame by selecting a subset of the third predefined number of clusters, each group being one of the clusters in the selected subset.

7. The video tracker according to claim 6, wherein the processor is further configured to assign a weight to each pixel in the background area in the first frame, obtain a sum of weights of pixels in each of the third predefined number of clusters, and select the subset by selecting clusters in the third predefined number of clusters having corresponding sums over a second sum threshold.

8. A video tracker device comprising:
a memory for storing a video image comprising at least first and second frames, each pixel in the video image having at least one color component; and
a processor configured to:
obtain a window in a second frame of a video image corresponding to a window in a first frame of the video image using a tracking algorithm in a tracking mode, wherein each pixel in the video image has at least one color component;
compute a foreground color model for each one of at least two groups of pixels in the window in the first frame, each foreground color model comprising at least one color component computed from values of the color components of pixels in the corresponding group;
compute a background color model for each one of at least two groups of pixels in a background area around the window in the first frame, each background color model comprising at least one color component computed from values of the color components of pixels in the corresponding group;
determine a foreground color distance between a plurality of pixels in the window in the second frame and each of the foreground color models according to color component values and determining a foreground minimum color distance for each pixel of said plurality of pixels as a minimum of the determined foreground color distances;
determine a background color distance between a plurality of pixels in the window in the second frame and each of the background color models according to color component values and determining a background minimum color distance for each pixel of said plurality of pixels as a minimum of the determined background color distances;
assign a pixel confidence value for each pixel of said plurality of pixels in the second frame according to the corresponding foreground and background minimum color distances for the each pixel of said plurality of pixels in the window in the second frame;
select among the tracking mode or a mode different from the tracking mode, based on a window confidence value for the window in the second frame, wherein the window confidence value is obtained according to the pixel confidence values of said plurality of pixels in the window in the second frame.

* * * * *